(12) United States Patent
Ress, Jr. et al.

(10) Patent No.: US 11,181,007 B1
(45) Date of Patent: Nov. 23, 2021

(54) GAS TURBINE ENGINE BEARING WITH FUEL LUBRICATION AND COOLING

(71) Applicant: Florida Turbine Technologies, Inc., Jupiter, FL (US)

(72) Inventors: Robert A Ress, Jr., Carmel, IN (US); Brian E Taylor, Stuart, FL (US)

(73) Assignee: FLORIDA TURBINE TECHNOLOGIES, INC., Jupiter, FL (US)

( * ) Notice: Subject to any disclaimer, the term of this patent is extended or adjusted under 35 U.S.C. 154(b) by 172 days.

(21) Appl. No.: 16/288,704

(22) Filed: Feb. 28, 2019

(51) Int. Cl.
| F01D 25/12 | (2006.01) |
| F01D 25/18 | (2006.01) |
| F02C 3/045 | (2006.01) |
| F02C 7/18 | (2006.01) |

(52) U.S. Cl.
CPC ........... *F01D 25/125* (2013.01); *F01D 25/18* (2013.01); *F02C 3/045* (2013.01); *F02C 7/18* (2013.01); *F05D 2220/32* (2013.01)

(58) Field of Classification Search
CPC ........ F01D 25/14; F01D 25/18; F01D 25/125; F01D 25/22; F02C 3/045; F05D 2220/32
See application file for complete search history.

(56) References Cited

U.S. PATENT DOCUMENTS

| 2,709,567 A | 12/1948 | Wood |
| 3,078,667 A | 2/1963 | Deinhardt |
| 3,377,802 A | 4/1968 | Wilkinson et al. |
| 4,080,783 A | 3/1978 | Hamburg et al. |
| 4,205,525 A | 6/1980 | Hamburg et al. |
| 4,502,274 A | 3/1985 | Girault |
| 4,531,357 A * | 7/1985 | Weber ...................... H02K 5/20 60/785 |
| 4,599,862 A * | 7/1986 | Bergeron ............... F01M 13/00 60/605.3 |
| 4,838,028 A | 6/1989 | Witt |
| 5,489,190 A | 2/1996 | Sullivan |
| 5,526,640 A | 6/1996 | Brooks et al. |
| 5,568,984 A | 10/1996 | Williams |
| 6,327,857 B1 | 12/2001 | Fredriksson |
| 7,748,209 B1 * | 7/2010 | Schopf ...................... F02C 7/06 60/39.08 |
| 7,937,946 B1 | 5/2011 | Harris et al. |
| 9,488,104 B2 | 11/2016 | Junod |
| 2007/0028589 A1 * | 2/2007 | Alexander ............ F01D 25/125 60/39.08 |
| 2009/0101087 A1 * | 4/2009 | Ueno .................... F02B 39/005 123/41.31 |
| 2013/0287328 A1 * | 10/2013 | Frank ...................... F16C 33/58 384/476 |

(Continued)

*Primary Examiner* — Todd E Manahan
*Assistant Examiner* — Rodolphe Andre Chabreyrie
(74) *Attorney, Agent, or Firm* — Katherine Koenig; Koenig IP Works, PLLC

(57) ABSTRACT

A gas turbine engine with a bearing that is supplied with fuel and compressed air for both cooling and lubrication of the bearing. The bearing housing contains a serpentine flow cooling circuit with each leg formed from a plurality of parallel flow channels, and where fuel is supplied to the cooling circuit and then discharged into a combustor. Some of the fuel is also bled off and passed into the bearing compartment along with compressed air bled off from the compressor to both cool and lubricate the bearing.

16 Claims, 6 Drawing Sheets

(56) References Cited

U.S. PATENT DOCUMENTS

| | | | |
|---|---|---|---|
| 2015/0275761 A1* | 10/2015 | Duffy | F02C 7/12 |
| | | | 60/805 |
| 2018/0224043 A1* | 8/2018 | Hendrickson | F16L 33/00 |
| 2018/0347398 A1* | 12/2018 | Falkus | F02C 7/143 |

* cited by examiner

GAS TURBINE ENGINE BEARING WITH FUEL LUBRICATION AND COOLING

CROSS-REFERENCE TO RELATED APPLICATIONS

None.

GOVERNMENT LICENSE RIGHTS

None.

BACKGROUND OF THE INVENTION

Field of the Invention

The present invention relates generally to a gas turbine engine, and more specifically to the lubrication and cooling of a main bearing for the engine.

Description of the Related Art Including Information Disclosed Under 37 CFR 1.97 and 1.98

An expendable gas turbine engine such as one used for a single mission must be simple and affordable. Prior art gas turbine engines utilize recirculating oil for bearing lubrication and bearing cooling. This design is not practical for an expendable engine due to high cost and long storage life issues. Grease packed bearings have been successfully utilized in expendable engine applications. However, they are limited to DN's (diameter of the rotor times the speed of the rotor) of less than one million (1,000,000). While fuel has been utilized in expendable gas turbine engines for bearing lubrication and cooling, a large percentage of the fuel is utilized for bearing cooling.

BRIEF SUMMARY OF THE INVENTION

An expendable gas turbine engine in which fuel is used to lubricate and to cool the main bearing compartment, and where the heated fuel used for cooling is then discharged into the combustor, a small amount of fuel is also supplied to the bearing housing for lubrication and then discharged overboard. This design minimizes the amount of fuel lost and also minimizes the amount of fuel required to cool the bearing.

The fuel lubrication and cooling design for a gas turbine engine is best used in the main shaft bearing in the rear or aft end location where the thermal environment is most challenged. The design incorporates a fuel cooled bearing housing using a serpentine cooling circuit having a number of parallel channels embedded into the housing. The housing is a two-piece brazed assembly where the cooling circuit is formed in one of the two housing elements. The cooling circuit is produced through conventional machining, an electrical discharge machining (EDM) process, or through an additive manufacturing (AM) process such as 3D printing. The fuel passing through the serpentine circuit pulls heat from the bearing outer ring through conduction in addition to removing heat transmitted to the housing from the surrounding hot structure.

DETAILED DESCRIPTION OF THE INVENTION

The present invention is an apparatus and a process for lubricating and cooling a main bearing of an expendable gas turbine engine using fuel. Fuel is supplied to a serpentine flow cooling circuit formed in a bearing housing that flows through parallel channels and the heated fuel is then discharged into the combustor of the engine. Some of the fuel is discharged into the bearing to merge with cooling air from the compressor for lubrication of the bearing, where the lubrication fuel is then discharged overboard.

Figure 1:
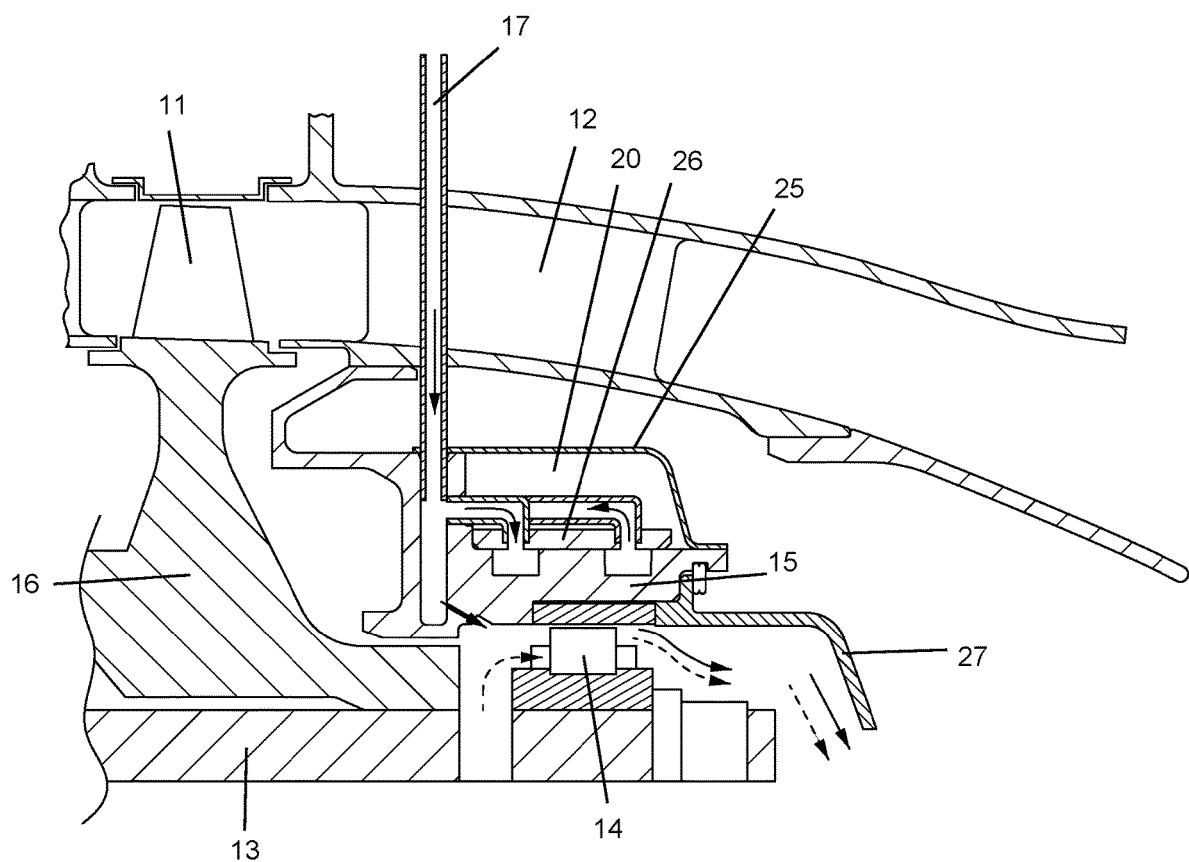
FIG. 1 shows a cross section view of the rotor and bearing assembly with the fuel lubrication and cooling design of the present invention.

FIG. 1 shows a cross section view of the rear bearing housing of the gas turbine engine with a rotor blade 11 extending from a rotor disk 16, a stator vane 12, a rotor or shaft 13, a main bearing 14 with an inner race on the shaft 13 and an outer race secured on a bearing housing 15, a fuel supply tube 17, a bearing housing cover 26 with two holes for a fuel supply tube and a fuel discharge tube described below, a heat shield 25 defining an air cavity or insulator 20, and a flow deflector plate 27. The bearing housing 15 has an inner surface on which the outer race of the bearing 14 abuts. The bearing housing also has an outer surface on which is formed a number of annular extending radial ribs that form channels for a coolant such as fuel.

FIG. 1 shows the fuel supply tube 17 used to deliver the coolant to the coolant supply tube 21 (shown on FIG. 2) with a small amount bled off to flow into the bearing compartment along with compressed air from the compressor. The fuel (solid arrow) and compressed air (dashed arrow) are mixed and then flow through the bearing to both lubricate and cool the bearing 14, after which both the fuel and the compressed air are discharged to atmosphere. A flow deflector 27 is used to deflect inward the discharged fuel and compressed air from the bearing compartment.

Figure 2:
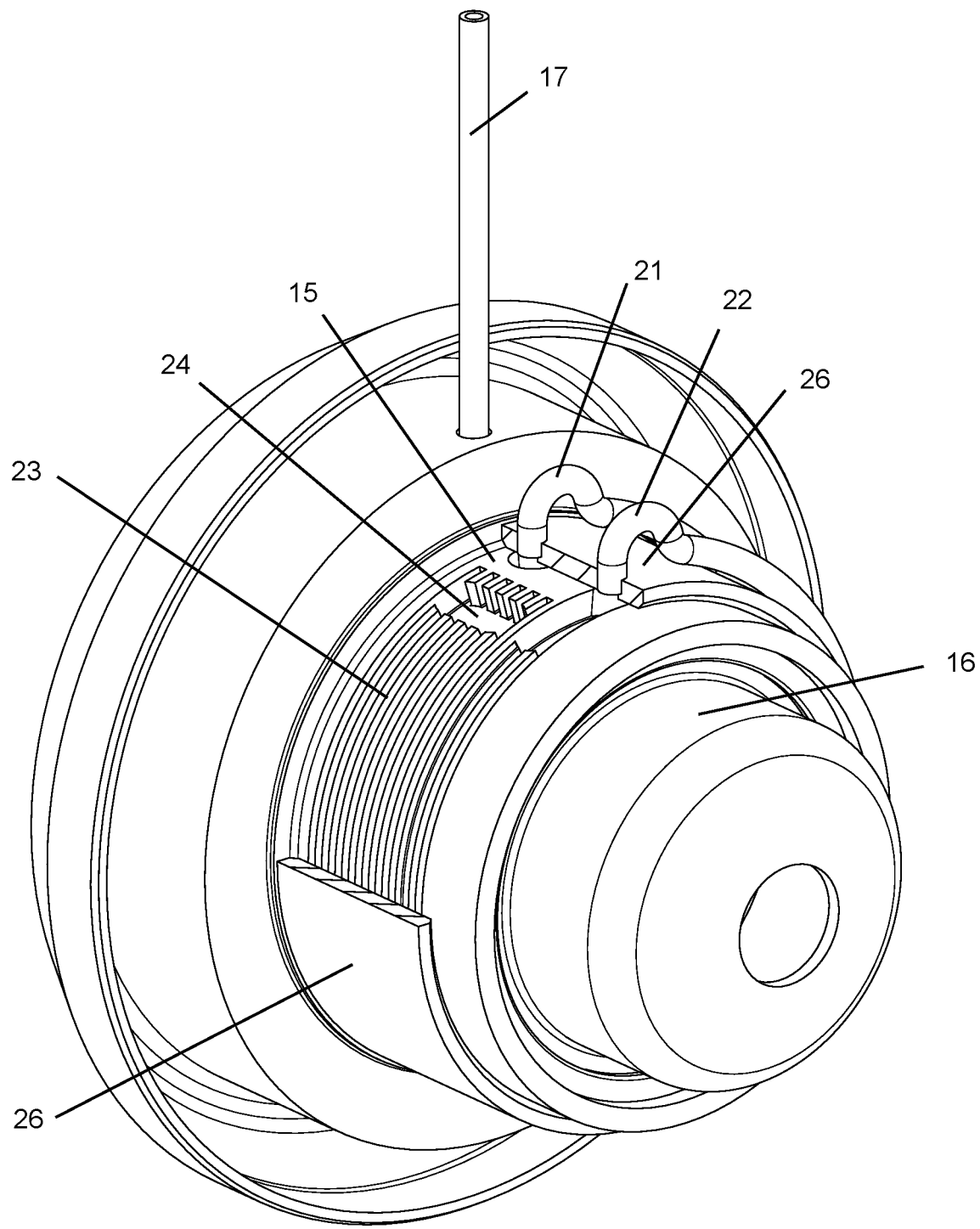
FIG. 2 shows an isometric view of the cooled rear bearing housing with a section removed to show the serpentine circuit.

FIG. 2 shows a view of the cooled bearing housing with the coolant channels 23 formed on the outer surface of the bearing housing 15. A coolant supply tube 21 delivers a coolant to the cooling channels 23 and a coolant discharge tube 22 removes the coolant from the cooling channels 23. The cover plate 26 fits over the bearing housing with the cooling channels 23 to enclose the cooling channels. If fuel is used as the coolant, then the fuel discharge tube delivers the heated fuel to the combustor.

The cooling circuit for the bearing housing is formed as a three leg serpentine flow cooling circuit in which a first leg flows from the supply tube 21 around the bearing housing in a clockwise direction of almost a full 360 degree turn, then flows through a second leg in a counter-clockwise direction at almost a full 360 degree turn, and then through a third leg in a clockwise direction at almost a full 360 degree turn. The cooling channels 23 cover substantially all of the bearing housing with the surfaces at the supply and discharge tubes not being covered.

Each of the three legs is formed by a number of ribs that define the flow channels. In this embodiment, five ribs formed six flows channels with three flow channels in the first leg and three channels in the second leg.

Figure 3:
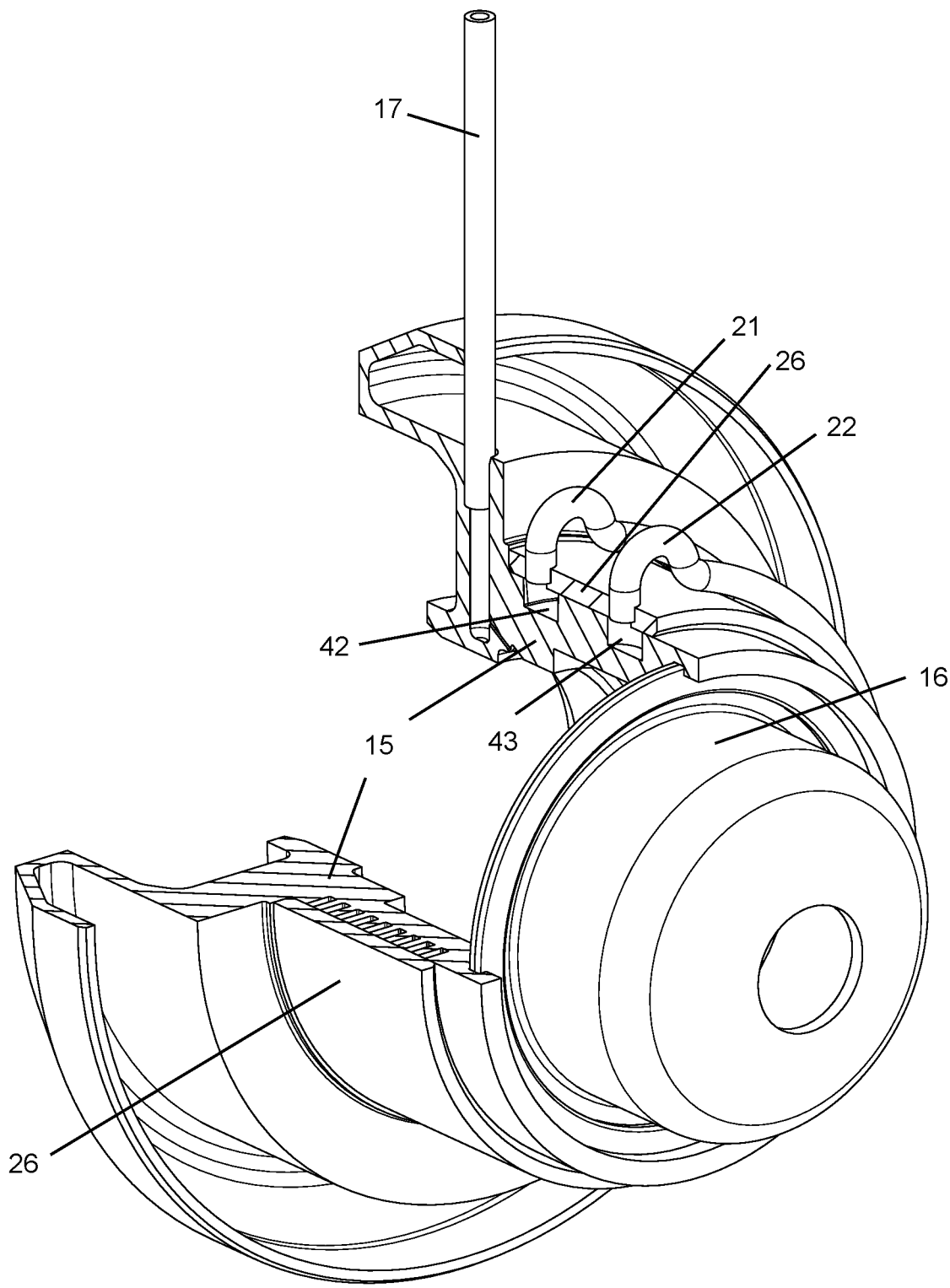
FIG. 3 shows a cutaway view of the cooled rear bearing housing in FIG. 2.

The coolant supply tube 21 passes through the supply hole in the housing cover 26 and into a common first leg supply channel 42 (FIG. 3). The inlet ends of the three parallel channels that form the first leg opens into the first leg supply channel 42. The coolant then flows through the first leg coolant channels around the bearing housing in a clockwise direction and into a first coolant turn channel 24 (FIG. 2) where the coolant from the first leg turns 180 degrees and flows into the second leg of the serpentine flow cooling circuit formed by three ribs that define three parallel cooling channels that flow in a counter-clockwise direction of FIG. 2.

Figure 4:
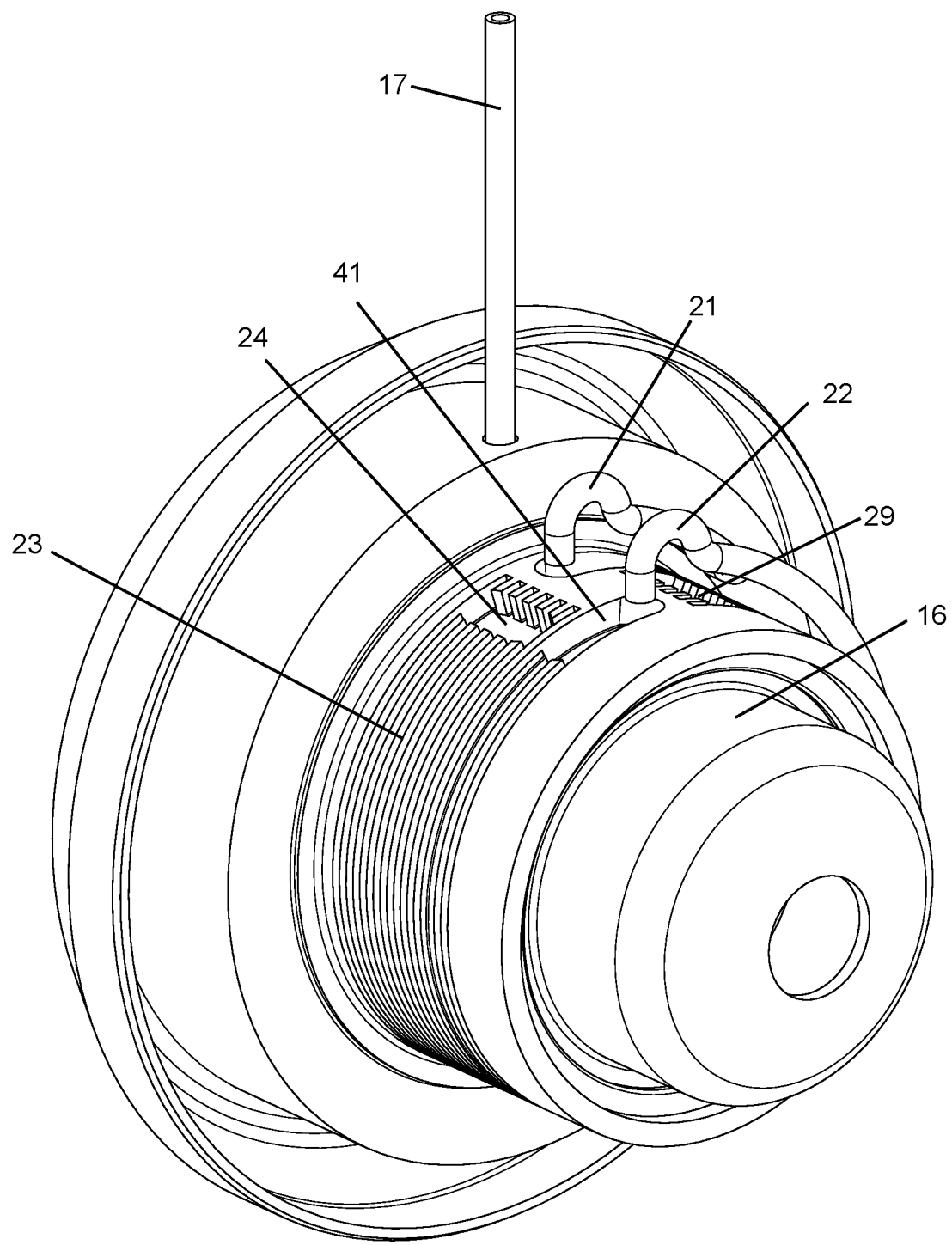
FIG. 4 shows an isometric view of the serpentine cooling circuit for the fuel around the bearing housing.

The coolant in the second leg then flows into a second coolant turn channel 29 (FIG. 4) where the coolant turns 180 degrees and then flows into a third leg of the serpentine flow cooling circuit in a clockwise direction to FIG. 4. The third leg is also formed with three parallel flow channels that form an almost full 360 degree turn. The coolant then flows around the bearing housing in the third leg and is discharged into a coolant discharge channel 41 (FIG. 4) that connects to the discharge tube 22 through the discharge hole in the housing cover 26. All of the flow channels of the third leg discharge into the discharge channel 41.

The coolant in this embodiment is fuel for the engine that is used to cool the bearing housing and preheat the fuel prior to the fuel being discharged into the combustor. The serpentine flow cooling circuit of the present invention discloses three legs in which each leg is formed with three parallel channels. However, in other embodiments each leg could be formed with two parallel channels or four parallel channels depending on the size of each channel and the size of the bearing housing.

Figure 5:
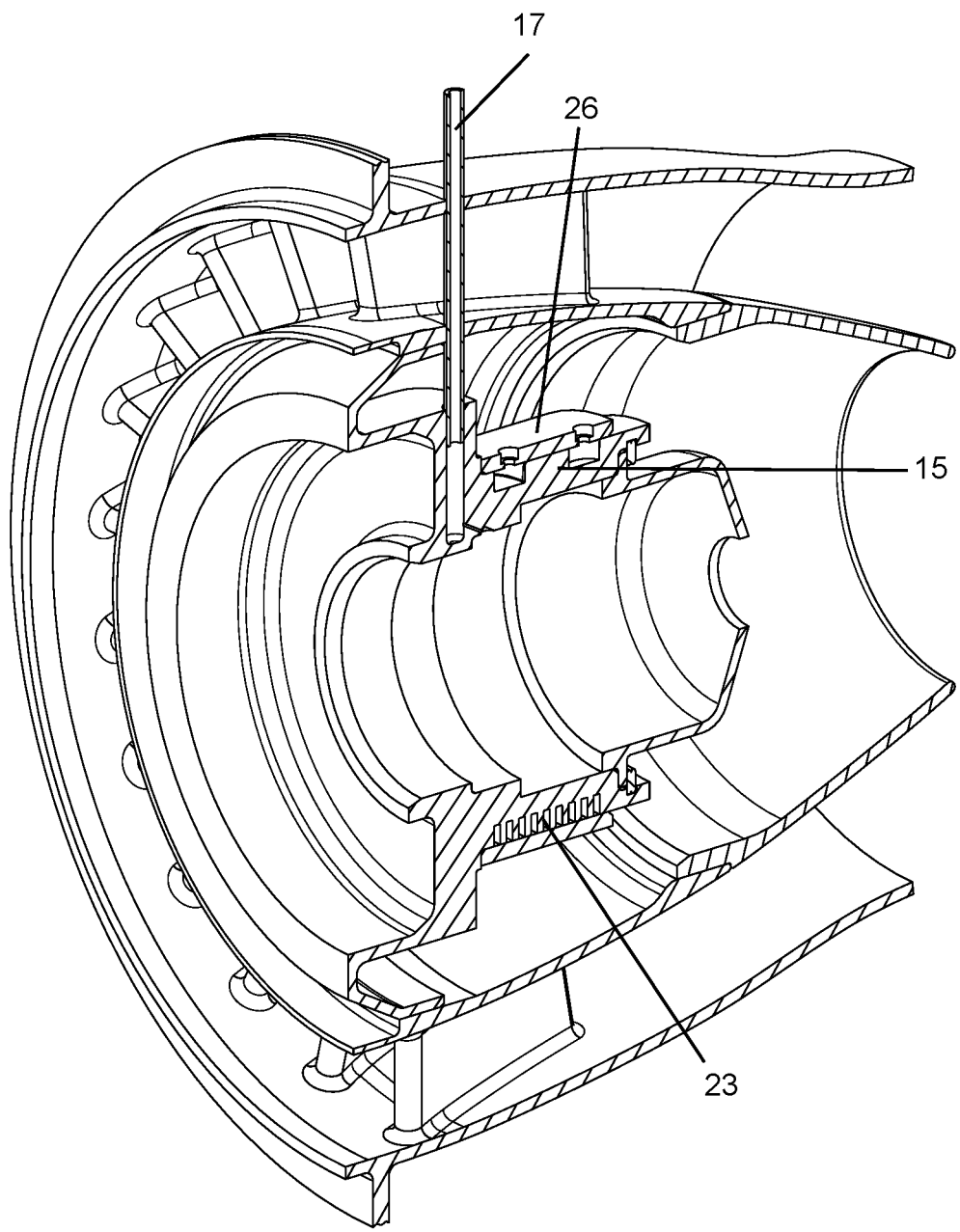
FIG. 5 shows an isometric cutaway view of the section of the engine in FIG. 5 with the bearing housing and the heat exchange circuit.

FIG. 5 shows a cut-away view of the section of the engine with the bearing housing cooling circuit. The fuel tube 17 extends into the bearing housing 15. The parallel cooling channels 23 are shown on a bottom side of the bearing housing 15. The housing cover 26 is shown with the two holes for the supply and discharge tubes 21 and 22.

Figure 6:
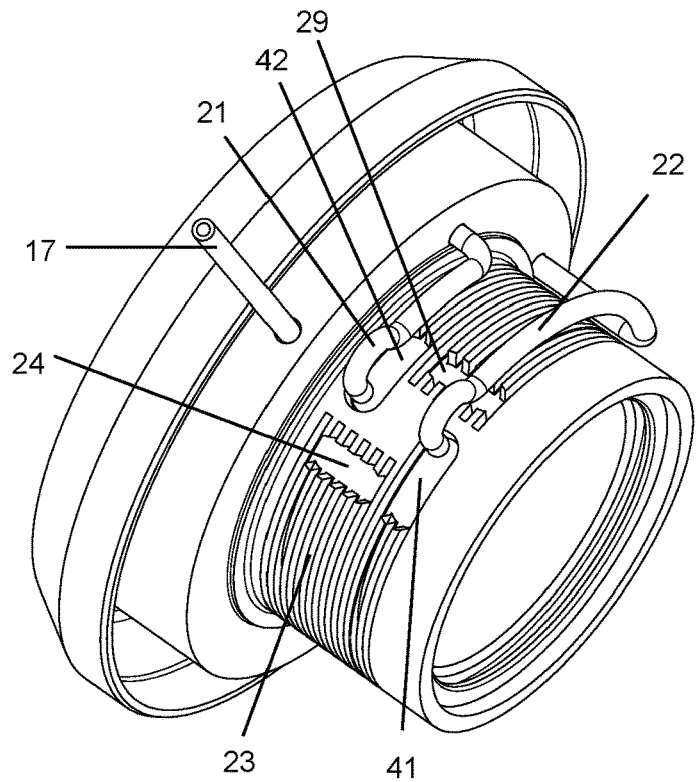
FIG. 6 shows an isometric view of the bearing housing with the serpentine cooling circuit and fuel supply and discharge lines.

FIG. 6 shows another view of the bearing housing cooling circuit with the fuel delivery tube 21 that opens into the first leg supply channel 42, the first leg of the serpentine flow cooling circuit that discharges into the first turn channel 24, then flows into the second leg of the serpentine flow circuit and into the second turn channel 29, where the coolant from the second leg then flows into the third leg. The third leg then discharges into the discharge channel 41 that connects to the discharge tube 22.

Figure 7:
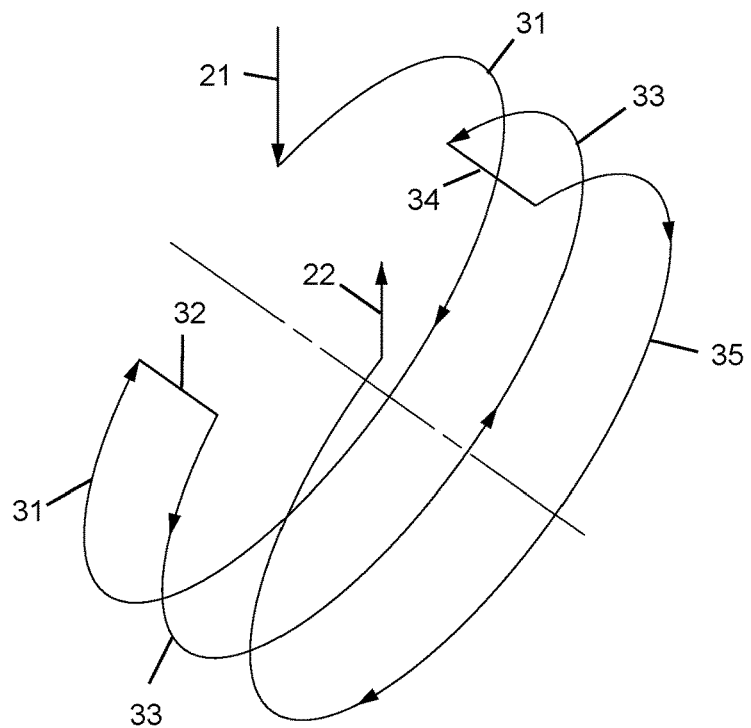
FIG. 7 shows a flow diagram for the fuel in the serpentine cooling circuit of FIG. 6.

FIG. 7 shows a flow diagram for the three (triple) pass serpentine flow cooling circuit of the bearing housing. Fuel delivered from the supply tube 21 flows into the first leg 31 and around the inside of the bearing housing, and then into the turn channel 32 where the fuel turns 180 degrees and flows into the second leg 33 around the bearing housing outward from the first leg 31. The coolant in the second leg 33 then flows into the second turn channel 34 and turns 180 degrees and flows into the third leg 35 and flows around the bearing housing outward from the second leg 33. The coolant from the third leg 35 then flows out the bearing housing into the discharge tube 22. Each of the three legs in FIG. 7 has three parallel flow channels. In FIG. 7, the first turn channel 32 represents the first turn channel 24 in FIG. 6, and the second turn channel 34 represents the second turn channel 29 in FIG. 6.

The invention claimed is:

1. A gas turbine engine comprising:
   a compressor;
   a turbine;
   a shaft connecting the compressor to the turbine;
   a bearing supporting the shaft;
   a bearing housing, the bearing being located between the shaft and the bearing housing; and
   a coolant tube to deliver a coolant to the bearing housing, the coolant tube having a supply channel at an upstream end and a discharge channel at a downstream end, the bearing housing having an outer surface and a plurality of ribs on the outer surface, the plurality of ribs defining:
      a first plurality of enclosed parallel cooling channels that are each in direct fluid communication with the supply channel and are configured to direct the coolant in a first flow direction;
      a second plurality of enclosed parallel cooling channels that are configured to direct the coolant in a second flow direction opposite the first flow direction; and
      a third plurality of enclosed parallel cooling channels that are each in direct communication with the discharge channel and are configured to direct the coolant in the first flow direction,
      the first plurality of enclosed parallel cooling channels, the second plurality of enclosed parallel cooling channels, and the third plurality of enclosed parallel cooling channels together forming a serpentine flow cooling circuit around the bearing housing;
   wherein,
      the coolant flows from the coolant tube and through the serpentine flow cooling circuit to provide cooling to the bearing through the bearing housing.

2. The gas turbine engine of claim 1, wherein:
the coolant tube also connects to a bearing compartment to supply some of the coolant to lubricate the bearing.

3. The gas turbine engine of claim 2, wherein:
compressed air from the compressor is mixed with the coolant upstream from the bearing to cool and lubricate the bearing.

4. The gas turbine engine of claim 1, wherein:
the first, second, and third pluralities of enclosed parallel cooling channels are annular cooling channels which cover substantially all of the bearing housing.

5. The gas turbine engine of claim 1, wherein:
the serpentine flow cooling circuit is a three-pass serpentine flow cooling circuit.

6. The gas turbine engine of claim 1, wherein the serpentine flow cooling circuit includes:
   a first coolant turn channel between the first plurality of enclosed parallel cooling channels and the second plurality of enclosed parallel cooling channels; and
   a second coolant turn channel between the second plurality of enclosed parallel cooling channels and the third plurality of enclosed parallel cooling channels.

7. The gas turbine engine of claim 1, wherein the coolant is fuel for a combustor, the gas turbine engine further comprising:
   a discharge tube that is in direct fluid communication with the discharge channel, the discharge tube connecting the serpentine flow cooling circuit of the bearing housing with the combustor such that a preheated fuel is discharged into the combustor.

8. A process for operating a gas turbine engine, the gas turbine engine having a compressor connected to a gas turbine through a shaft with a bearing to support the shaft, the bearing being within a bearing housing, the process comprising the steps of:
   compressing air with the compressor for delivery to a combustor;
   supplying a fuel to the combustor;
   burning the fuel with the compressed air in the combustor to produce a hot gas flow;
   passing the hot gas flow through the gas turbine to drive the compressor;
   passing a first portion of the fuel through a serpentine flow cooling circuit formed within the bearing housing to cool the bearing through the bearing housing and to preheat the fuel, the passing the first portion of the fuel through the serpentine flow cooling circuit including:
      passing the first portion of the fuel simultaneously through a first plurality of enclosed parallel cooling channels extending around the bearing housing in a clockwise direction; and
      then passing the first portion of the fuel simultaneously through a second plurality of enclosed parallel cooling channels extending around the bearing housing in a counter-clockwise direction; and
   discharging the preheated first portion of the fuel used to cool the bearing housing into the combustor.

9. The process for operating a gas turbine engine of claim 8, and further comprising the step of:
   after passing the first portion of the fuel simultaneously through the second plurality of enclosed parallel cooling channels, passing the first portion of the fuel simultaneously through a third plurality of enclosed parallel cooling channels extending around then bearing housing in the clockwise direction.

10. The process for operating a gas turbine engine of claim 8, and further comprising the step of:
   passing some a second portion of the fuel into a bearing compartment to provide lubrication and cooling to the bearing.

11. The process for operating a gas turbine engine of claim 10, and further comprising the step of:
   bleeding off some of the compressed air from the compressor; and
   passing some of the compressed air into the bearing compartment to provide cooling for the bearing.

12. A bearing assembly comprising:
   a shaft;
   a bearing housing, the bearing housing having an annular shape with a plurality of enclosed parallel cooling channels formed therein, the bearing housing defining a bearing compartment;
   a bearing with within the bearing compartment, the bearing having an inner race contacting the shaft and an outer race contacting the bearing housing; and
   a fuel supply tube being connectable to a fuel source, the fuel supply tube defining a first flow path and a second flow path, the first flow path being in fluid communication with the bearing compartment and the second flow path being in communication with the plurality of enclosed parallel cooling channels, the fuel supply tube being configured such that at least a first portion of a fuel supplied from the fuel source through the fuel supply tube passes through the first flow path and into the bearing compartment to lubricate and cool the bearing and at least a second portion of the fuel supplied from the fuel source through the fuel supply tube passes through the second flow path and into the plurality of enclosed parallel cooling channels, the fuel being a coolant, the plurality of enclosed parallel cooling channels having a coolant inlet and a coolant outlet, the coolant inlet being in fluid communication with the fuel supply tube,
   the fuel supplied to the plurality of enclosed parallel cooling channels providing cooling of the bearing through the bearing housing.

13. The bearing assembly of claim 12, wherein:
   the plurality of enclosed parallel cooling channels form a serpentine flow cooling circuit.

14. The bearing assembly of claim 13, wherein:
   the serpentine flow cooling circuit is a three-pass serpentine flow cooling circuit.

15. The bearing assembly of claim 13, wherein the serpentine flow cooling circuit includes:
   a first leg having a first plurality of the plurality of enclosed parallel cooling channels, the first plurality of the plurality of enclosed parallel cooling channels being defined by a first at least one rib extending from an outer surface of the bearing housing;
   a second leg having a second plurality of the plurality of enclosed parallel cooling channels, the second plurality of the plurality of enclosed parallel cooling channels being defined by a second at least one rib extending from the outer surface of the bearing housing;
   a third leg having a third plurality of the plurality of enclosed parallel cooling channels, the third plurality of the plurality of enclosed parallel cooling channels being defined by a third at least one rib extending from the outer surface of the bearing housing;
   a first coolant turn channel between the first leg and the second leg, the first leg extending in a clockwise direction from the coolant inlet to the first coolant turn channel; and
   a second coolant turn channel between the second leg and the third leg, the second leg extending in a counter-clockwise direction from the first coolant turn channel to the second coolant turn channel and the third leg extending in the clockwise direction from the second coolant turn channel to the coolant outlet.

16. The bearing assembly of claim 12, wherein:
   the plurality of enclosed parallel cooling channels extends substantially around an entirety of the bearing housing.

* * * * *